United States Patent [19]

Duff et al.

[11] Patent Number: 5,052,025
[45] Date of Patent: Sep. 24, 1991

[54] SYNCHRONOUS DIGITAL SIGNAL TO ASYNCHRONOUS DIGITAL SIGNAL DESYNCHRONIZER

[75] Inventors: Donald G. Duff, Lincroft, N.J.;
Donald A. Lane, Salem, N.H.;
Ricardo Mediavilla, Eatontown, N.J.

[73] Assignee: AT&T Bell Laboratories, Murray Hill, N.J.

[21] Appl. No.: 572,740

[22] Filed: Aug. 24, 1990

[51] Int. Cl.[5] .......................................... H04L 7/04
[52] U.S. Cl. .................................... 375/118; 328/55;
369/60; 370/49
[58] Field of Search ................ 370/48, 49, 105.3, 108;
375/106, 117, 118, 119; 328/55, 155; 377/66,
78; 365/78, 221; 369/60; 307/590, 597

[56] References Cited

U.S. PATENT DOCUMENTS

| 4,525,849 | 6/1985 | Wolf | 377/78 |
| 4,761,800 | 8/1988 | Lese et al. | 370/49 |
| 4,899,352 | 2/1990 | Cucchi et al. | 369/60 |
| 4,928,275 | 5/1990 | Moore et al. | 375/118 |

OTHER PUBLICATIONS

Contribution to T1 Standards Project—T1X1.4, "Effects of Pointer Manipulations on Network Wander Characteristics", Malcolm Betts, Northern Telecom Incorporated, T1X1.4/87-402, Dec. 17, 1986.
Contribution to T1 Standards Project, T1X1.6/88-026, "A Synchronous Desynchronizer", Sabit Say, Bellcore, Jul. 25, 1988.
Contribution to T1 Standards Project, T1X1.6/89-012, "Sonet Desynchronisers", Andy Reid, British Telecom, Feb. 8, 1989.

Primary Examiner—Benedict V. Safourek
Attorney, Agent, or Firm—Thomas Stafford

[57] ABSTRACT

Improved jitter performance is realized in a desynchronizer for obtaining an asynchronous digital signal, e.g., a DS3 signal, from a received synchronous digital signal, e.g., a SONET STS-1 signal. The improved jitter performance results from the use of a unique adaptive bit leaking arrangement in conjunction with a digital phase locked loop and synchronizing elastic store. An estimate of a bit leaking interval is adaptively obtained based on the intervals between a sequence of consecutive pointer adjustments in the received signal, i.e., the STS-1 signal. In one embodiment, the bit leaking interval estimate is obtained by employing a moving average of the intervals between the pointer adjustments. The desired bit leaking is effected by employing an accumulator which is responsive to the received pointer adjustments and a representation of the estimated bit leaking interval, in conjunction with a comparator. The accumulator output count is supplied to the comparator along with the current write address of the elastic store. Leak bits are supplied as an output from the comparator one at a time to the phase locked loop which, in turn, generates a smooth read clock for the elastic store.

12 Claims, 4 Drawing Sheets

SYNCHRONOUS DIGITAL SIGNAL TO ASYNCHRONOUS DIGITAL SIGNAL DESYNCHRONIZER

TECHNICAL FIELD

This invention relates to digital transmission systems and, more particularly, to converting synchronous digital signals to asynchronous digital signals.

BACKGROUND OF THE INVENTION

Prior techniques and arrangements for converting synchronous digital transmission signals to asynchronous digital signals are known. In recent digital transmission systems it has become important to smooth large gaps in a supplied data signal resulting from overhead bit removal and stuff bits. This is particularly important, for example, in converting a SONET STS-1 synchronous digital signal to a DS3 asynchronous digital signal. As is known, in the STS-1 signal format, so-called pointer adjustments are used to reconcile small phase and frequency differences between a clock signal derived from an incoming STS-1 signal and a local clock signal. These adjustments are made on a byte-wise basis and can be either positive or negative. During normal system operation, the pointer adjustments occur relatively infrequently. This causes a low frequency, relatively large peak-to-peak jitter component in the signal. When the system operation is degraded, pointer adjustments may occur more often. Thus, a wide range of pointer adjustment rates is possible. A so-called bit leaking technique in conjunction with a phase locked loop and a synchronizing elastic store has been proposed in an attempt at smoothing gaps in a data signal caused by the pointer adjustments in a SONET signal format. A bit leak is defined as one (1) bit of phase error being supplied to a phase locked loop. One of these techniques employs a bit-by-bit leaking adjustment so that a phase locked loop having a "wider" bandwidth may be employed in the desynchronizer. This bit-by-bit technique, however, does not adequately compensate for the full range of pointer adjustment rates which may occur. An attempt at compensating for the pointer adjustments employing an adaptive bit leaking arrangement has also been proposed. However, to the best of our knowledge the proposed adaptive bit leaking arrangements still cause excessive jitter to occur in the asynchronous digital signal, e.g., the DS3 signal, or just simply do not operate satisfactorily.

SUMMARY OF THE INVENTION

The problems associated with prior known bit leaking arrangements are overcome, in accordance with the invention, by employing a unique adaptive bit leaking arrangement in conjunction with a synchronizing elastic store and digital phase locked loop. An interval at which bits are leaked to the phase locked loop to effect phase adjustments is controllably adaptively updated by utilizing a unique bit leaking interval estimation technique. This unique bit leaking interval estimation technique results in significantly improved jitter performance in a resulting asynchronous digital signal.

More specifically, this unique bit leaking interval estimating technique achieves the improved jitter performance by generating a desired bit leaking interval based on a past sequence of the so called received signal pointer adjustments.

In one exemplary embodiment of the invention, the bit leaking interval is adaptively obtained by employing a moving average of the time intervals between consecutive pointer adjustments in the received signal.

The bit leaking is realized in a smooth manner, in one embodiment of the invention, by advantageously employing an accumulator in conjunction with a comparator. The accumulator is responsive to pointer adjustments in the received signal and a representation of the estimated bit leaking interval to supply a bit leak count to the comparator. Also supplied to the comparator is the current write address of the elastic store which is generated in response to a gapped incoming clock signal. The comparator supplies the desired leak bits at the estimated leaking interval to the phase locked loop to effect the phase adjustments in a smooth manner. In turn, the phase locked loop generates a smooth read clock signal for the elastic store.

A technical advantage of the invention is that satisfactory jitter performance is realized while using a digital phase locked loop having a realively "wider" bandwidth than would otherwise be required.

DETAILED DESCRIPTION

Figure 1:
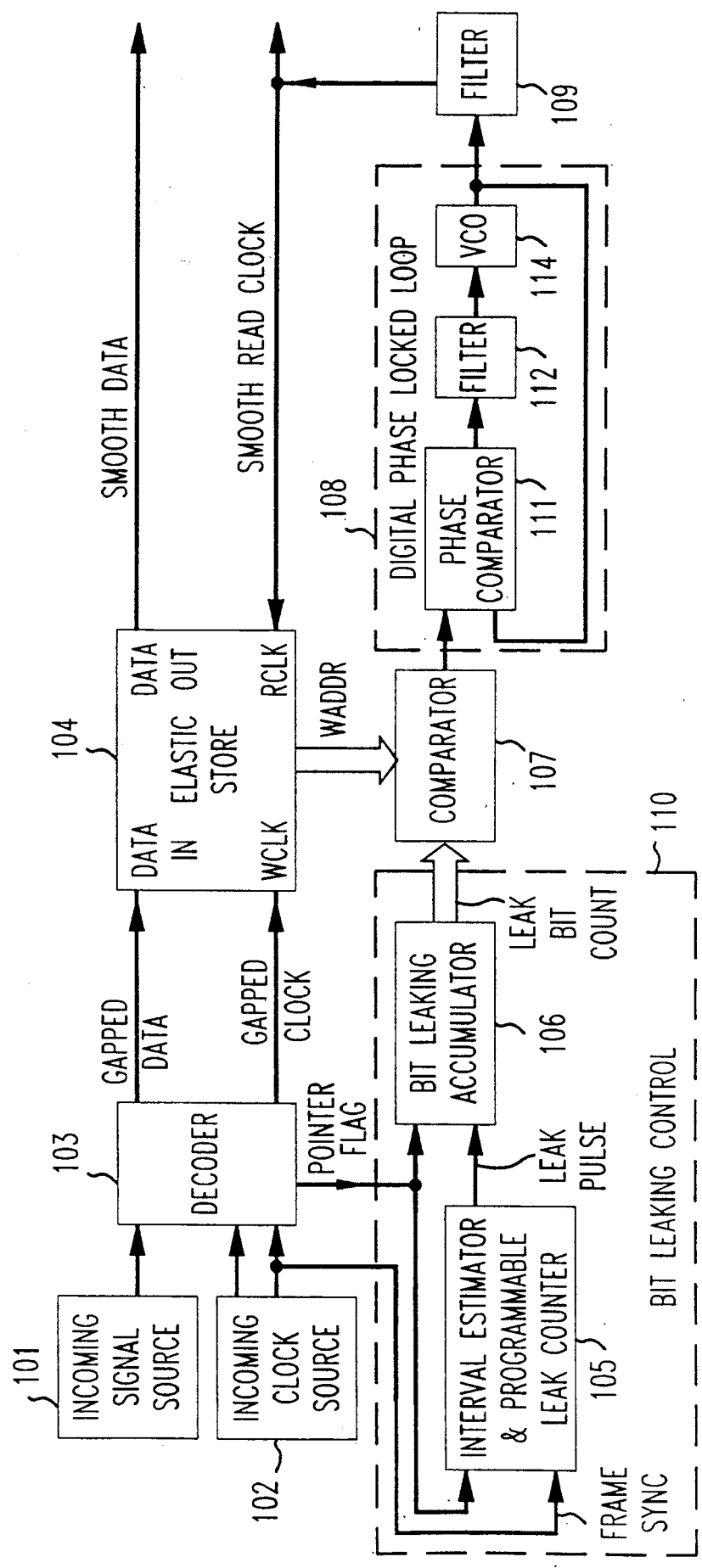
FIG. 1 shows in simplified block diagram form, a synchronous digital signal to asynchronous digital signal conversion arrangement including an embodiment of the invention.

FIG. 1 shows, in simplified block diagram form, details of a synchronous to asynchronous digital signal conversion arrangement including an embodiment of the invention. Accordingly, shown are incoming signal source 101 and incoming clock signal source 102. In one example, the incoming signal is the STS-1 SONET signal and the incoming clock signal is the STS-1 clock of 51.84 MHz. The incoming clock signal is typically derived from the incoming signal in known fashion. Incoming clock source 102 also generates a frame sync signal. In this example, the frame sync signal is at the STS-1 rate of 8 KHz. The SONET STS-1 signal format is described in a Technical Advisory entitled "SONET Transport Systems: Common Generic Criteria", TA-TSY-000253, Bell Communications Research, February 1989 and the ANSI draft Standard entitled "Digital Hierarchy—Optical Interface Rates and Formats Specifications (SONET)", dated February 1990.

Decoder 103 is supplied with the incoming signal, incoming clock signal and frame sync signal and is employed, in this example, to convert the STS-1 signal into a gapped DS3 digital signal and to convert the STS-1 clock signal into a gapped clock signal. The DS3 digital signal format is well known and is described in *Telecommunications Transmission Engineering*, AT&T, Volume 2, 1977. Decoder 103 supplies a so-called gapped data signal and gapped clock signal to synchronizing elastic store 104. Decoder 103 also generates a pointer FLAG indicative of a pointer adjustment in the incoming STS-1 signal and whether or not it is a positive or negative adjustment. Arrangements for obtaining a DS3 payload signal from a STS-1 SONET signal format are known. It will also be apparent to individuals possessing ordinary skill in the art how to detect the presence of a pointer adjustment in the STS-1 signal from either the ANSI draft standard or Technical Advisory noted above. Specifically, the H1 and H2 bytes in the STS-1 signal format indicate the occurrence of a pointer adjustment and whether the adjustment is positive or negative. Detection of the H1 and H2 bytes in the STS-1 signal format is relatively straight forward.

Figure 2:
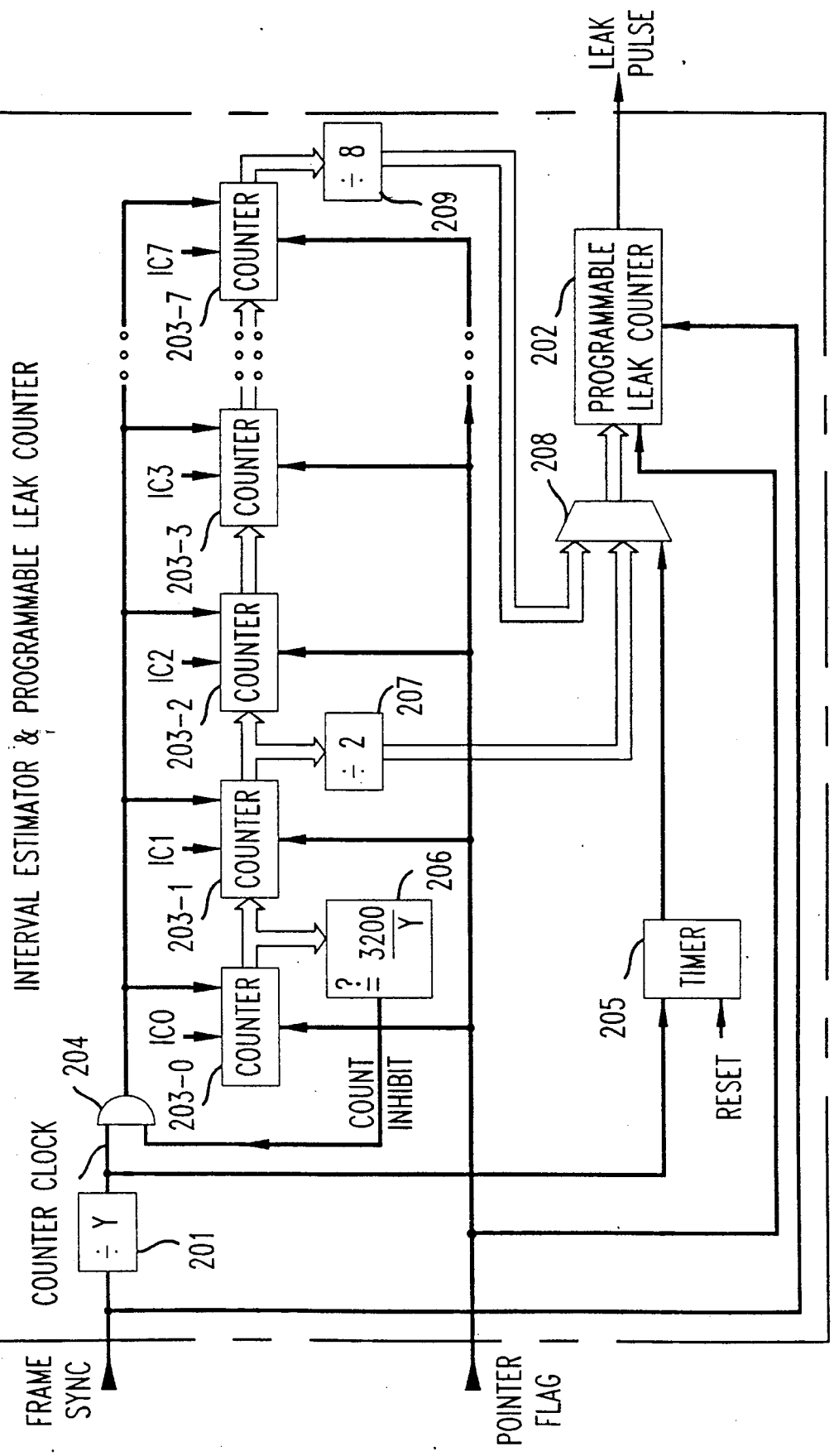
FIG. 2 depicts, in simplified block diagram form, details of interval estimator and programmable leak counter 105 of FIG. 1.

Frame sync is supplied to bit leaking control 110 and, therein, to interval estimator and programmable leak counter 105. The pointer FLAG is supplied from decoder 103 to bit leaking control 110 and, therein, to interval estimator and programmable leak counter 105 and to bit leaking accumulator 106. Bit leaking control 110 operates, in accordance with the invention, to controllably adaptively leak a bit count to compensate for pointer adjustments in the incoming digital signal, in this example, the STS-1 digital signal. It is noted that both positive and negative pointer adjustments can occur and, consequently, both positive and negative leaking are needed. As noted above, the rate at which pointer adjustments occur may vary. Interval estimator and programmable leak counter 105 is advantageously employed, in accordance with the invention, to adaptively adjust the so-called bit leaking interval so that the bits are leaked at appropriate instants to smoothly compensate for the pointer adjustments at the different rates. This is important in order to minimize jitter in the smooth data signal output from elastic store 104. It is noted that if the bit leaking interval is too long "good" jitter performance is obtained, but elastic store 104 will tend to overflow under the presence of a relative clock frequency offset. If the bit leaking interval is too short, elastic store 104 will not overflow, but "poor" jitter performance results. A predetermined number of synchronous SONET STS-1 payload envelope bits should be leaked for each received pointer adjustment, their time separation being determined by the bit leaking interval. Preferably, eight (8) synchronous STS-1 payload envelope bits are leaked at a bit leaking interval determined by interval estimator and programmable leak counter 105. The SONET STS-1 payload rate is 50.112 MHz. To this end, leak pulses are supplied from interval estimator and programmable leak counter 105 to bit leaking accumulator 106 at the estimated interval. Details of interval estimator and programmable leak counter 105 are shown in FIG. 2 and described below. Operation of bit leaking control 110 is shown in the flow chart of FIGS. 3 and 4 and described below.

The bit leak count from bit leaking accumulator 106 is supplied to comparator 107 wherein it is compared to the current write address (WADDR) of elastic store 104. Although the write address is shown as being generated in elastic store 104, other arrangements may be used to obtain it, for example, an internal counter. Such other arrangements are considered also to be within elastic store 104. The result of the comparison in comparator 107 is supplied to digital phase locked loop 108 and, therein, to phase comparator 111. Digital phase locked loop 108 also includes filter 112 and a so-called voltage controlled oscillator 114. Such digital phase locked loop arrangements are readily implemented using digital circuit techniques and are known. It is noted that when a pointer adjustment occurs, both the write address (WADDR) of elastic store 104 and the leak bit count output of bit leaking accumulator 106 are advanced or retarded by one byte, i.e., eight (8) bits, depending on whether the adjustment is negative or positive. If the pointer adjustment is positive, both the write address and count of accumulator 106 are decremented. If the pointer adjustment is negative, the write address and count of accumulator 106 are incremented. Thus, upon occurrence of a pointer adjustment, comparator 107 initially sees no change. Then, bit leaking control 110 leaks the pointer adjustment bits one at a time to comparator 107 in a controlled manner at the estimated interval. The leaking of the bits is such that the count of bit leaking accumulator 106 moves toward a center position. This unique use of comparator 107 in junction with the count from accumulator 106 and the write address of elastic store 104 prevents the large phase adjustments normally caused by the pointer adjustments from being supplied to digital phase locked loop 108 and allows for the controlled leaking of the phase adjustment bits to digital phase locked loop 108, in accordance with the invention. The adaptive bit leaking interval control of bit leaking control 110 in conjunction with digital phase locked loop 108 significantly improves jitter performance in the resulting smooth data signal, e.g., a DS3 signal, in the presence of pointer adjustments in the incoming digital signal, e.g., the STS-1 signal. An output of digital phase locked loop 108 is supplied via filter 109 to the read clock (RCLK) input of elastic store. Filter 109 is employed in this example to filter "high" frequency jitter in the output signal from digital phase locked loop 108. The output from filter 109 is the desired smooth read clock signal. The desired smooth data signal, e.g., a DS3 digital signal, is supplied as an output at the data out output of elastic store 104.

FIG. 2 shows, in simplified block diagram form, details of interval estimator and programmable leak counter 105. As indicated above, bits are to be leaked, i.e., supplied to digital phase locked loop 108, in a controlled manner to smoothly adjust for the phase and frequency differences caused by the pointer adjustments in the incoming STS-1 signal. It is important that the interval in which the bit leaking occurs at is such that good jitter performance is obtained. This is realized, in accordance with the invention, by controllably adaptively adjusting the bit leaking interval. The adaptive adjustment is obtained, in this embodiment of the invention, by generating a bit leaking interval based on a past sequence of pointer adjustments. To this end, interval estimator and programmable leak counter 105 adaptively generates a so-called leak pulse at an interval determined by employing a moving average of the time intervals between consecutive pointer adjustments in the received STS-1 signal. Accordingly, the frame sync signal is supplied to divider 201 and to programmable leak counter 202. The frame sync signal is, in this example, 8 KHz. Divider 201 divides the frame sync signal by Y to obtain counter clock. Y is a predetermined number related to the smooth read clock rate of elastic store 104. Preferably, Y is a number greater than the relevant number of smooth data bits to be leaked per pointer adjustment. In this example, the smooth data signal is the DS3 signal and Y is eight (8). The pointer FLAG is supplied to counters 203-0 through 203-7 and to programmable leak counter 202. Eight counters 203 are employed to obtain a desired moving average of the intervals between consecutive pointer adjustments. The number eight is a reasonable tradeoff between jitter performance and the size of the storage capacity of elastic store 104 and bit leaking accumulator 106 (FIG.

1). An output from divider 201 is the counter clock and is supplied via AND gate 204 to each of counters 203-0 through 203-7 and to timer 205. Also supplied to counters 203-0 through 203-7 are initial parameters IC0 through IC7, respectively. These initial parameters are obtained, in this example, in accordance with $IC_i = 3200\, i/Y$, where i is the number of the counter, i.e., 0, 1, . . . , 7 and Y is the divisor of divider 201. The counts from each of counters 203 are controllably supplied to the next subsequent one of counters 203 in order to obtain the moving average. The counts are shifted in response to the pointer FLAG signal. The count output of counter 203-0 is supplied to unit 206 which determines if counter 203-0 is in a saturated condition. Such a condition is when the count of counter 203-0 reaches 3200/Y. At such time, unit 206 generates an inhibit signal which disables AND gate 204 and the count in counters 203 is frozen. This disables the adaptive adjustment of the bit leaking interval.

The count output from counter 203-1 is also supplied to divider 207. Divider 207, in this example, has a divisor of two (2) and supplies an average over two (2) count to controllable selector 208. Timer 205 enables selector 208 to supply the average over two (2) count to programmable leak counter 202 for a predetermined interval after system start up or reset. Otherwise, selector 208 supplies the average over eight (8) count from divider 209 to programmable leak counter 202. The selected average count is loaded into programmable leak counter 202 in response to the pointer FLAG. This is so that bit leaking accumulator 106 and elastic store 104 converge more rapidly during system start up or reset. Otherwise, an accumulator and elastic store having more storage capacity would be required. Timer 205 also supplies a signal to disable divider 209 during the predetermined interval. The divisor of divider 209 is eight (8) to obtain an average over eight (8) of the output count value from counter 203-7. The average over eight (8) count is supplied via selector 208 upon termination of the predetermined interval to programmable leak counter 202. The selected average count is loaded into programmable leak counter 202 in response to the pointer FLAG. Programmable leak counter 202 is responsive to the supplied average count signal and generates a leak pulse upon reaching the average count in response to the frame sync signal.

Figure 3:
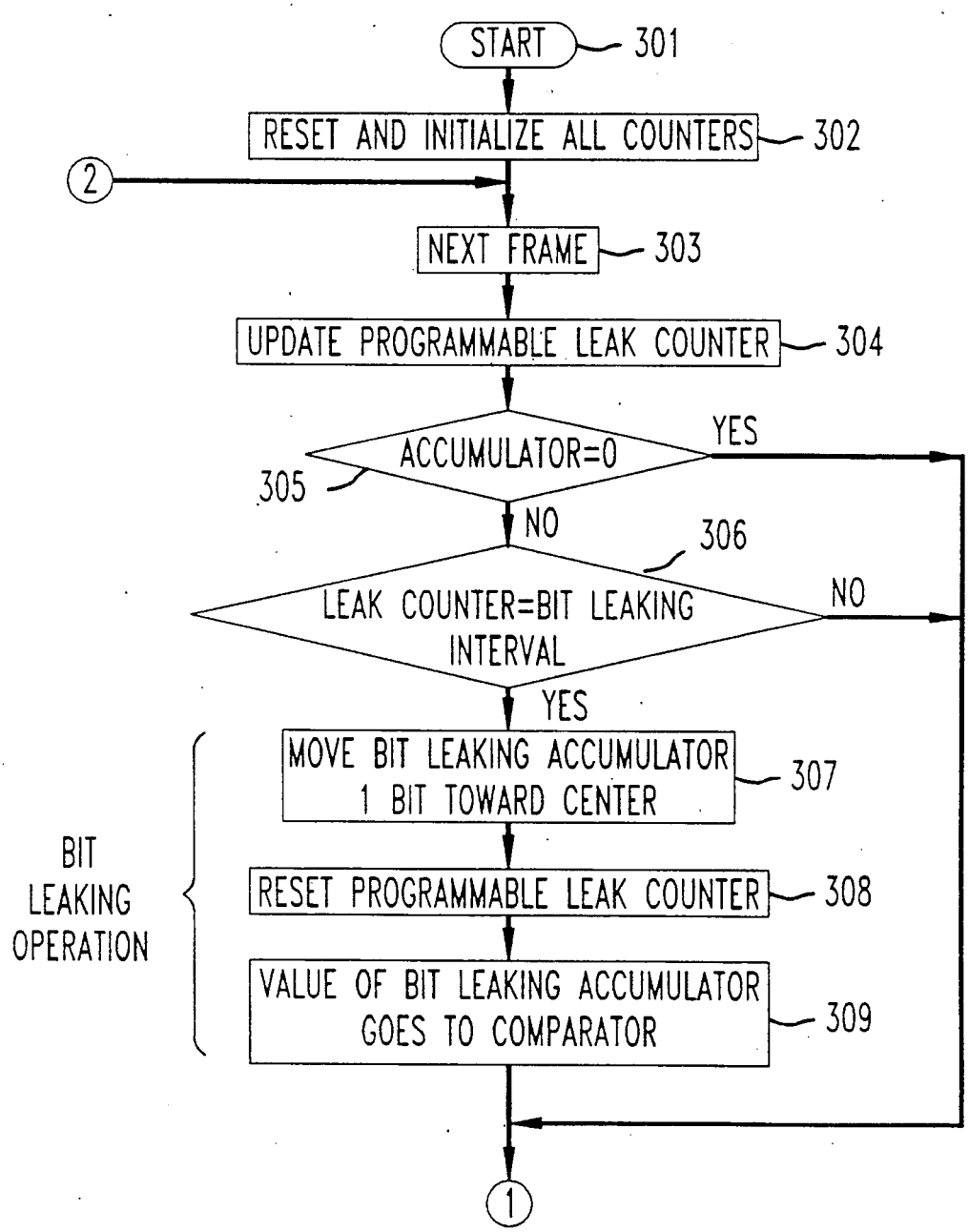
FIGS. 3 and 4 illustrate in flow chart form the operation of bit leaking control 110 of FIG. 1.
Figure 4:
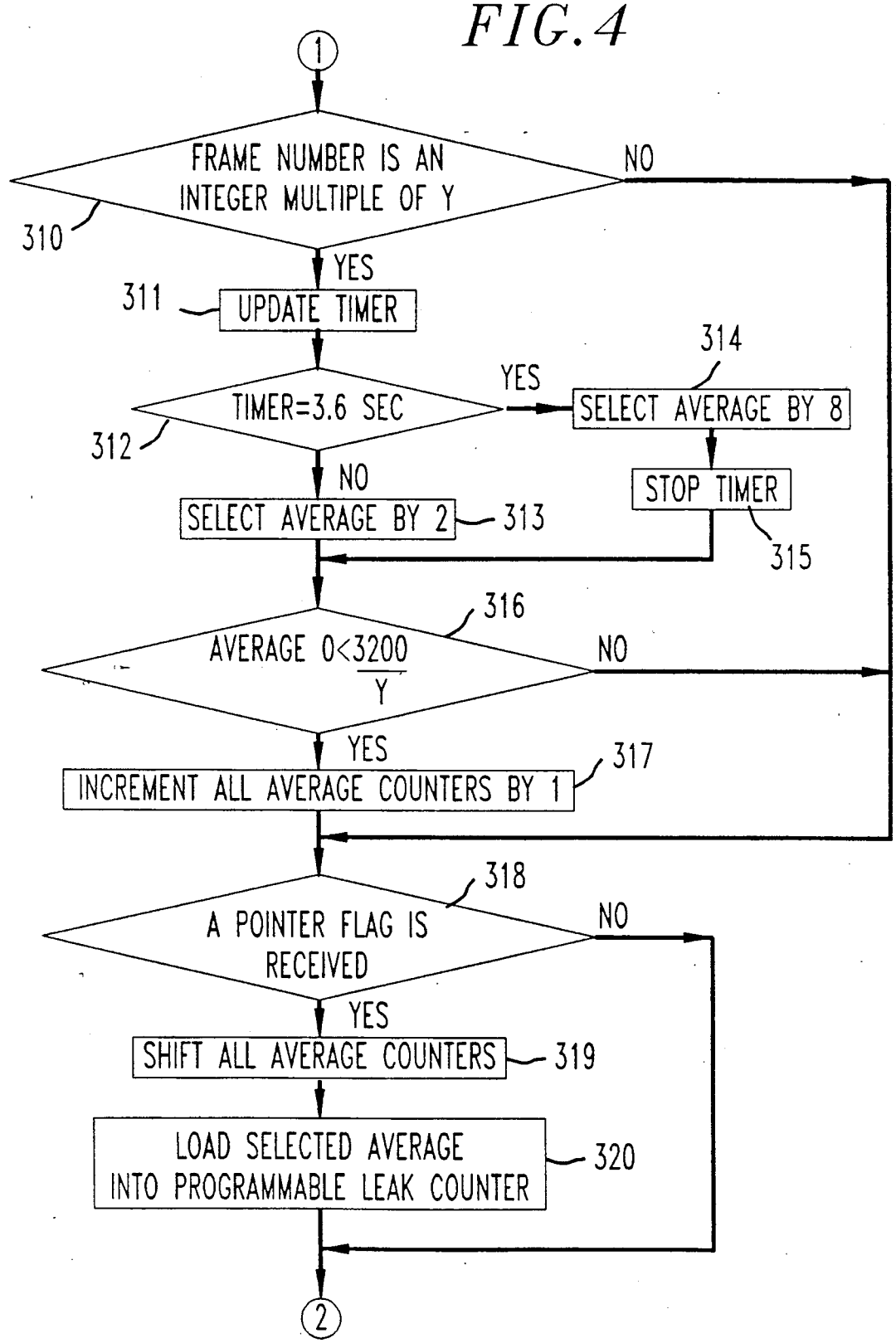

FIGS. 3 and 4 when connected 1—1 and 2—2 form a flow chart illustrating operation of bit leaking control 110 and, therein, interval estimator and programmable leak counter 105 and bit leaking accumulator 106 in adaptively generating a leak bit count value at an appropriate bit leaking interval. Accordingly, the process is begun via start step 301. In step 302, bit leaking control 110 is reset and the count values are initialized in each of counters 203 (FIG. 2), as described above. Step 303 indicates a next frame in response to the frame sync signal and step 304 updates programmable leak counter 202. Step 305 tests whether the value in bit leaking accumulator 106 is zero (0). If the test result is YES, control is passed to step 310. If the test result in step 305 is NO, step 306 tests whether the count in programmable leak counter 202 equals the average count value, i.e., the adaptively estimated bit leaking interval. If the test result in step 306 is NO, control is passed to step 310. If the test result in step 306 is YES, then the bit leaking operation is effected. To this end, step 307 causes bit leaking accumulator 106 to move one (1) bit toward center. Accumulator 106 is responsive to the pointer FLAG to increment or decrement its count by Y-1. In this example, Y-1 corresponds to the number of DS3 bits in a pointer adjustment. Step 308 resets programmable leak counter 202 to its initial count. In step 309, the value of bit leaking accumulator 106 is supplied to comparator 107 (FIG. 1). It should be noted that bits are not leaked until a pointer adjustment has occurred. Step 310 tests to determine if the number of frame sync signals is an integer multiple of Y. If the test result is NO, control is passed to step 318. If the test result in step 310 is YES, step 311 causes timer 205 to be updated. Step 312 tests to determine if timer 205 has reached the predetermined interval which, in this example, is 3.6 seconds. If the test result is NO, step 313 selects the average over two (2) count output of divider 207 to be supplied to programmable leak counter 202. If the test result in step 312 is YES, the predetermined interval has lapsed and step 314 selects the average over eight (8) output from divider 209 to be supplied to programmable leak counter 202. Step 315 stops timer 205 until the system is restarted or reset. Step 316 tests if the count value of counter 203-0 is less than 3200/Y. If the test result is NO, incrementing of counters 203 is inhibited as described above and control is passed to step 318. If the test result in step 316 is YES, saturation has not been reached and step 317 increments each of counters 203 by one (1). Step 318 tests to determine if a pointer FLAG indicating a pointer adjustment has occurred has been received. If the test result is NO, control is passed to step 303. If the test result in step 318 is YES, a pointer FLAG has been received and step 319 causes the count values in counters 203 to be shifted, as described above. Finally, step 320 causes the selected average value to be loaded into programmable leak counter 202 in response to the pointer FLAG. As indicated above, until timer 205 times out the average over two (2) count output of divider 207 is selected and once it times out the average over eight (8) count output of divider 209 is selected.

We claim:

1. Apparatus for desynchronizing an incoming digital signal at an incoming digital clock rate to obtain an outgoing digital signal at an outgoing digital clock rate different from the incoming digital clock rate, the apparatus comprising:

a source of an incoming digital signal;

a source of an incoming clock signal and incoming frame sync signal;

means for detecting occurrences of pointer adjustments in said incoming digital signal and for generating a first control signal representative of the occurrence and direction of said pointer adjustments, each of said pointer adjustments including a predetermined number of bits;

means for obtaining a gapped data signal from said incoming digital signal;

means for obtaining a gapped clock signal from said incoming clock signal;

means supplied with said frame sync signal and being responsive to said first control signal for adaptively generating an estimate of an interval between said bits in said pointer adjustment and for generating a second control signal at said estimated interval;

means responsive to said first and second control signals for generating a third control signal indicative of a bit adjustment;

a digital phase lock loop for generating an output clock signal, said digital phase lock loop being responsive to a phase adjustment signal;

means for comparing said third control signal and a write address for obtaining said phase adjustment signal; and elastic store means supplied with said gapped data signal, said gapped clock signal and said output clock signal for supplying as an output a smooth data signal synchronized to said output clock signal, said elastic store including means responsive to said gapped clock signal for generating said write address.

2. The apparatus as defined in claim 1 wherein said means for adaptively generating said estimate includes means for obtaining a prescribed average of intervals between consecutive occurrences of said pointer adjustments.

3. The apparatus as defined in claim 2 wherein said means for obtaining a prescribed average includes means for obtaining a moving average of said intervals between a number of consecutive occurrences of said pointer adjustments.

4. The apparatus as defined in claim 3 wherein said means for obtaining said moving average includes means for obtaining a first moving average, means for obtaining at least a second moving average and means for controllably selecting said first moving average or said at least second moving average as an output based on a predetermined criterion.

5. The apparatus as defined in claim 4 wherein said number for said first moving average is two and said number for said at least second moving average is eight.

6. The apparatus as defined in claim 4 further including a timer and wherein said predetermined criterion is to select said first moving average for a predetermined interval determined by said timer after system start up or reset and then select said at least second moving average.

7. The apparatus as defined in claim 2 wherein said means for generating an estimate and for generating a second control signal further includes a programmable counter supplied with said frame sync signal and means for controllably supplying a representation of said prescribed average for generating said second control signal.

8. The apparatus as defined in claim 4 wherein said means for generating an estimate and for generating a second control signal further includes a programmable counter supplied with said frame sync signal, said selected first moving average or at least second moving average output, and said first control signal for generating said second control signal.

9. The apparatus as defined in claim 1 wherein said incoming digital signal is a synchronous digital signal and said outgoing digital signal is an asynchronous digital signal.

10. The apparatus as defined in claim 9 wherein said synchronous digital signal is a SONET STS-1 digital signal and said asynchronous digital signal is a DS3 digital signal.

11. The apparatus as defined in claim 1 wherein said means for generating said third control signal comprises a digital accumulator which is responsive to said first and second control signals to generate said third control signal which represents a bit leak count.

12. The apparatus as defined in claim 1 further including filter means supplied with an output from said phase locked loop for filtering high frequency jitter from said output clock signal.

* * * * *